Figure 1:
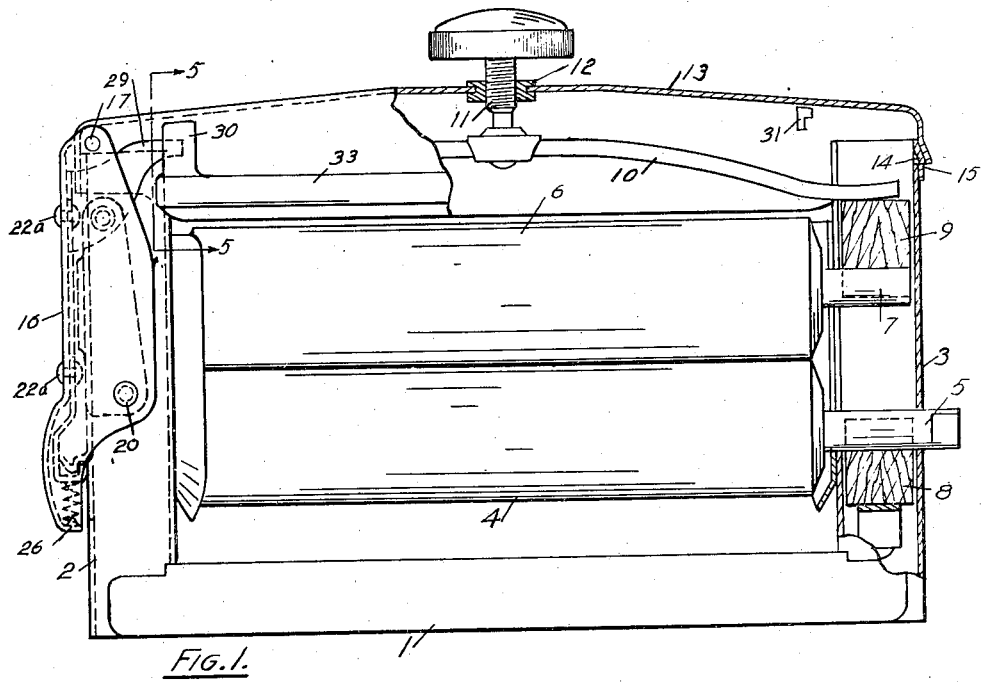

Feb. 25, 1941.  W. L. KAUFFMAN 2D  2,233,386
WRINGER SAFETY RELEASE
Filed March 17, 1937  3 Sheets-Sheet 1

INVENTOR.
Walter L. Kauffman II
BY
ATTORNEYS.

Feb. 25, 1941. W. L. KAUFFMAN 2D 2,233,386
WRINGER SAFETY RELEASE
Filed March 17, 1937 3 Sheets-Sheet 2
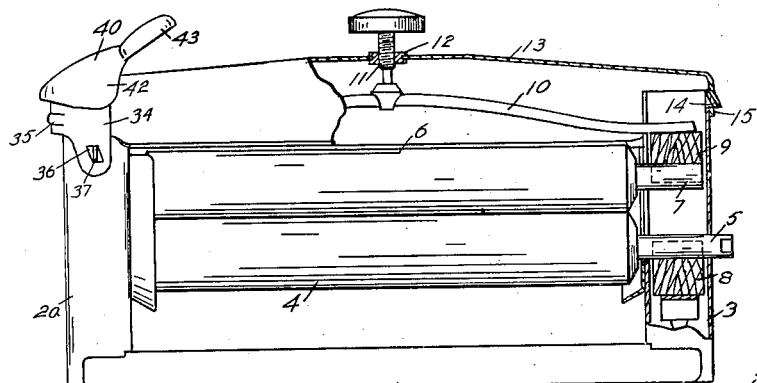
FIG. 6.
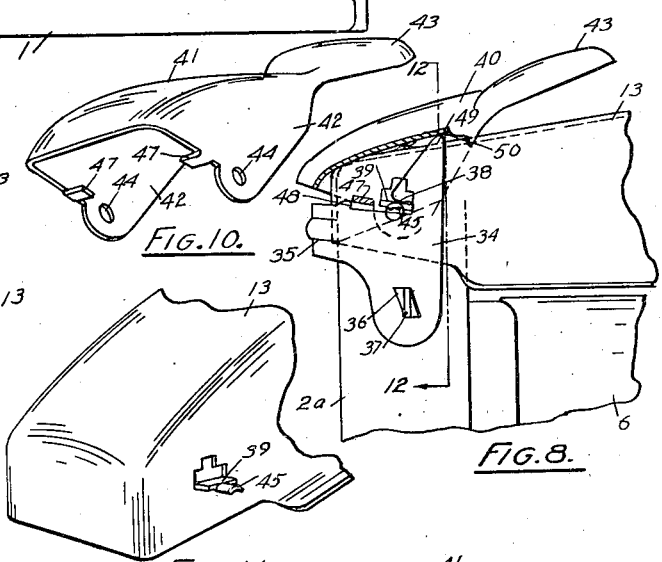
FIG. 10.
FIG. 8.
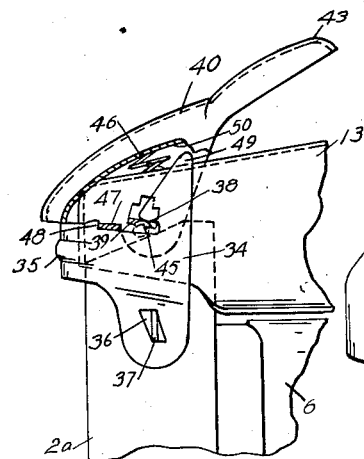
FIG. 7.
FIG. 11.
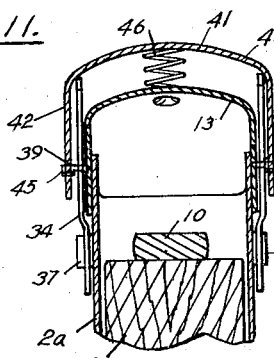
FIG. 12.
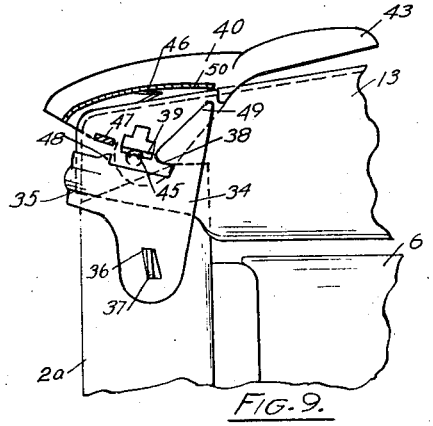
FIG. 9.
INVENTOR.
Walter L. Kauffman II
BY
ATTORNEYS.

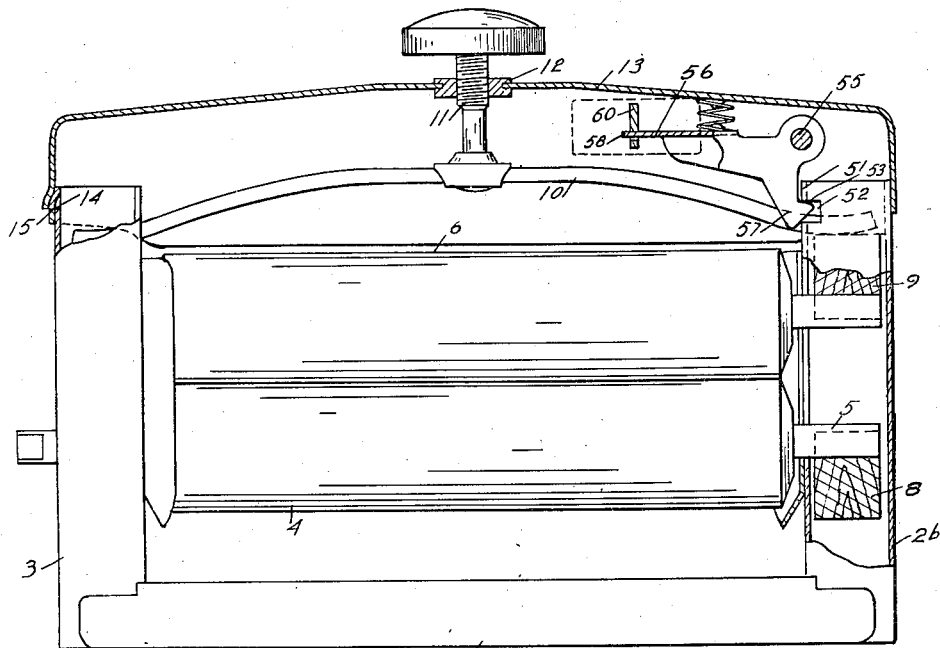
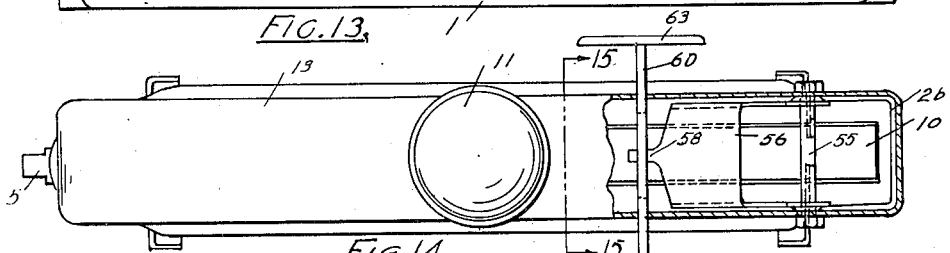
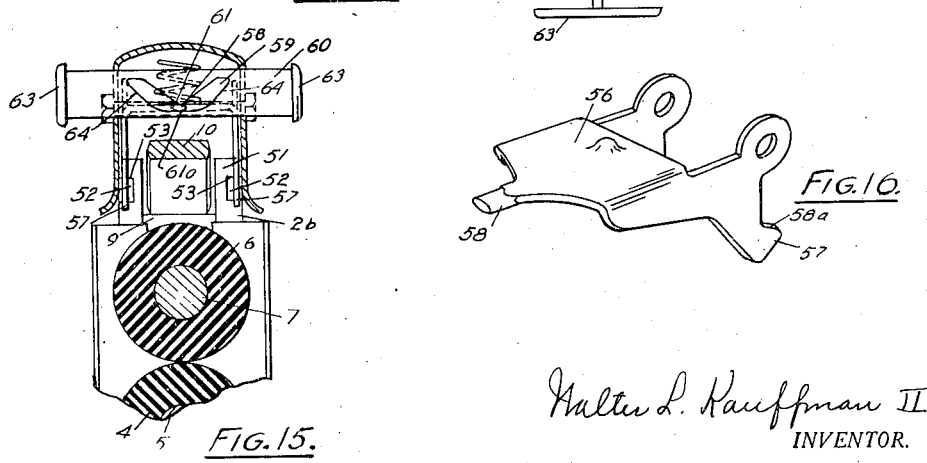

Patented Feb. 25, 1941

2,233,386

UNITED STATES PATENT OFFICE 2,233,386

WRINGER SAFETY RELEASE

Walter L. Kauffman, II, Erie, Pa., assignor to Lovell Manufacturing Company, Erie, Pa., a corporation of Pennsylvania Application March 17, 1937, Serial No. 131,330

20 Claims. (Cl. 68—263)

Power wringers are now ordinarily provided with safety releases which are designed to afford means for instantly releasing the pressure on the wringer rolls should the operator get caught in the rolls. The pressure spring of the wringer rolls, the pressure of which is released, exerts very heavy pressure on the rolls and a very heavy counter-pressure on the release mechanism. In consequence, if the engaged surfaces of the release mechanism are moved sufficiently to break the engagement by the direct movement of those surfaces through the force applied by the operator, a very considerable force is required to effect the release.

Inasmuch as this release is accomplished ordinarily under panic conditions, a very sensitive release is desirable, and various expedients have been used to accomplish this purpose with which type of release the releasing surfaces are engaged in a stable condition, that is, the surfaces themselves are of a nature that they will retain their set position except when forcibly moved from this position. The amount of effort required to accomplish the release is measured very largely by the extent of the stable condition. This stable condition, however, does assure the mechanism against accidental release through the very fact that the engaged surfaces are in stable relation.

Another type of release provides engaging surfaces receiving the direct counter-pressure of the spring which, in themselves, are unstable, that is, these surfaces would automatically accomplish a release through the pressure of the spring itself except that these mechanisms are provided with locking devices that lock the unstable engaging surfaces in engaged position. The engaged surfaces must be of such unstability that the mechanism will be positively released when the parts are unlocked by the locking device. In order to assure this positive release considerable pressure is exerted on the locking device and to this extent the device lacks sensitiveness.

The present invention is designed to provide a more sensitive release and at the same time one that is positive in its action. This is accomplished by providing engaging surfaces that are approximately at neutral, preferably slightly unstable, locking the engaged surfaces in set position and providing a positive trip mechanism adapted to go into action after the locking mechanism has released the surfaces to positively force the engaging surfaces to release should they fail to release upon the operation of the unlocking device. In this way a very sensitive mechanism may be provided and at the same time a positive release accomplished. Features and details of the invention will appear more fully from the specification and claims.

A preferred embodiment of the invention is illustrated in the accompanying drawings as follows:

Fig. 1 shows a front elevation of a wringer partly in section.

Figures 2, 3:
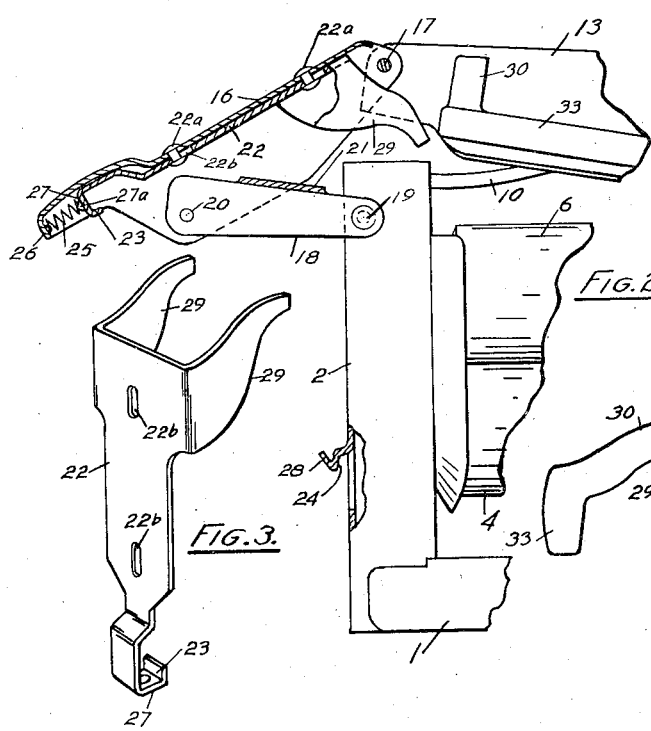

Fig. 2 an elevation partly in section of one end of the wringer showing the parts in release position.

Fig. 3 a perspective view of the latch.

Figure 4:
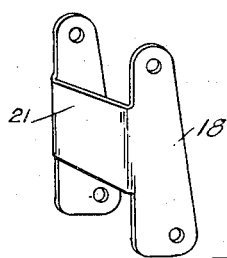

Fig. 4 a perspective view of a link in the mechanism.

Figure 5:
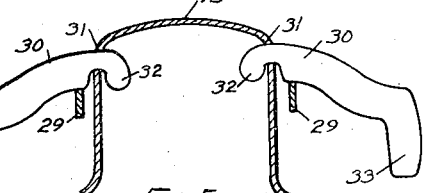

Fig. 5 a section on the line 5—5 in Fig. 1.

Fig. 6 shows a front elevation partly in section of a modification.

Fig. 7 a view of the release mechanism in modification of Fig. 6 showing the release mechanism in set position.

Fig. 8 a similar view with the locking device in unlocked position and the positive trip mechanism in position to act.

Fig. 9 a similar view with the release mechanism fully actuated.

Fig. 10 a perspective view of the release lever.

Fig. 11 a perspective view of the end of the top.

Fig. 12 a section on the line 12—12 in Fig. 8.

Fig. 13 a front elevation of a wringer partly in section showing a further modification.

Fig. 14 a plan view partly in section of the same modification.

Fig. 15 a section on the line 15—15 in Fig. 14.

Fig. 16 a perspective view of a release latch forming a part of the modification in Fig. 13.

In Figs. 1 to 5, 1 marks a base, 2 a stile, 3 an opposite stile, said stiles extending upwardly from the base, the base and stiles forming the frame of the wringer; 4 a lower wringer roll, 5 a shaft for the lower wringer roll, 6 an upper wringer roll, 7 a shaft for the upper wringer roll, 8 bearings for the lower roll, 9 bearing blocks for the upper roll, blocks 9 being slidingly mounted in the stiles; 10 a spring operating on the upper bearing blocks, 11 an adjusting screw operating on the spring, 12 a fitting in the top 13 through which the block operates, 14 a shoulder struck out of the face of the stile 3, 15 a shoulder formed on the end of the top 13 forming a detachable interlock for one end of the top. The parts so far as described are or may be of common construction.

A resetting lever 16 is pivoted at 17 on the end of the top opposite the shoulders 14 and 15. A toggle link 18 is pivotally mounted at 20 on the resetting lever and at 19 on the sides of the stile 2. The link 18 is formed with two sideplates, one engaging each side of the channel formed lever 16, and these side plates of the link 18 are connected by cross-plate 21. These parts are such that when the top is engaged through the shoulders 14 and 15 it may be depressed through the action of the resetting lever 16 and toggle link acting as a toggle as the lever 16 is swung downwardly. With the lever 16 in its final position along the side of the stile 2, the pivots 20, 19 and 17 are approximately in line as indicated in Fig. 1. Thus these parts are in neutral so far as stability is concerned with relation to the pressure exerted by the spring.

It will be understood that in ordinary manufacturing tolerances it is practically very difficult to maintain an exactly neutral position. A slight shifting in the position of the top bar would change this alignment either to give the lever 16 a stable condition when set or a very slight unstable condition. The effort is to make this so nearly neutral that it will be very sensitive and can be released with practically no effort. In order to positively lock the setting lever in set position and to afford a satisfactory release, therefore, the setting lever is provided with a sliding latch member 22 which is secured on the under-side of the lever by pins 22a operating in slots 22b in the latch member. The lower end of the latch member has a hook 23 which is adapted to extend under a lip 24 struck up in the outer face of the side stile 2. A light spring 25 yieldingly passes the latch member upwardly so as to carry the hook into engagement. The spring is anchored against flange 26 at the end of the resetting lever 16 and operates against the end 27 of the latch member, the latch member having a small projection 27a to locate the spring. The lip 24 is beveled at 28 so that when the resetting lever is forced downwardly the hook 23 engages the bevel and thus forces the member 22 downwardly to clear the lip.

The latch member has the inwardly extending arms 29 which straddle the top and these extend under the trip levers 30. The trip levers extend through slots 31 in the front and rear faces of the top and have the hook ends 32 adapted to retain them in the slots. The trip levers are connected with cross bars 33 extending across the front and rear of the wringer.

In the operation of the release device the trip levers operating on the arms 29 force the latch member 22 downwardly carrying the hook 23 out from under the lip 24. As the pivots are practically in neutral with the heavy spring, pressure is not transmitted to the latch surfaces of the hook 23 and the lip 24. Consequently this downward movement can be accomplished with very little effort. As soon as the latch member 22 reaches the lower position, however, as limited by the slots 22b acting on the pins 22a, if the latch member does not swing out because of a slight unstable condition, the continued movement of the top bar positively moves the resetting lever a sufficient distance to place it in an unstable position and it immediately flies open to release position under the pressure of the spring 10. In this way the release is positively locked in set position, is released with practically no effort, and the release is made positive.

In the modification shown in Figs. 6 to 12 the wringer parts described in relation to Fig. 1 up to and including from 1 to 15 are similar to those in Fig. 1 with the exception of the stile designated in the modification as 2a. The release mechanism in this modification comprises a latch 34. This is in the form of two plates, one at each side of the side stiles, these plates being connected by cross member 35. The side plates of the latch have openings 36 through which projections 37 struck up in the front and rear faces of the stile extend, thus forming a pivotal connection between the latch member 34 and the side stile. The side plates each have a hook 38 and this hook engages lips 39 struck up from the front and rear walls of the top bar. These lips 39 provide engaging surfaces for the hooks 28 and are inclined with relation to a line from the surfaces of the lips to the axis of the pivots formed by the projections 37 and this inclination is as near the critical angle of frictional resistance to movement as practicable. That is to say, the inclination is such that the latch member is neither positively stable nor unstable but just at the point of slipping through the pressure of the spring against the frictional resistance of the surfaces. A release lever 40 has a top plate 41, side plate 42, straddling the end of the top bar and the latch members 34, and it has an operating handle 43. The release lever has perforations 44 through which projections 45 on the lips 39 extend, the projections 45 forming a pivotal support for the release lever. A latch spring 46 holds the lever in its upper position. The side plates 42 have the inturned locking lips 47 which with the lever in its upper position rest on the upper edge of the cross member 35 and are located just inside of shoulders 48 on the cross member. Thus, so long as the lever is in its upper position these locking lips form a locking mechanism that positively holds the latch against release. With the initial downward movement of the latch lever these locking lips are raised from the position shown in Fig. 7 to the position shown in Fig. 8, thus permitting the latch to release, and should the latch be slightly unstable it will release. Should the latch be slightly stable it will require a further action.

In the present device the release lever is provided with a cam surface 50 on its under-side that contacts with an upper extension 49 on the latch 34 so that this extension 49 engages the cam surfaces just as the locking lips 47 release the shoulders 48 and a continued movement of the release lever starts the latch 34 toward the release as indicated in Fig. 9 and therefore positively effects a release.

In the modification shown in Figs. 13 to 16 the wringer parts from 1 to 15 are similar to those of Fig. 1 with the exception of one stile which, in this modification, is designated as 2b. The stile 2b has inturned flanges 51 on its inner face and these are notched at 52 forming shoulders 53.

A latch member of U shape has the two side plates, each having a hook 57 with an engaging surface 58a adapted to engage the shoulders 53. The sides of the latch plate are connected by a cross plate 56 and the latch is pivoted to the inside of the top bar by a pin 55 extending through the latch member and the top bar.

The latch member has a setting extension 58 which extends into a cam slot 59 in a cross slide 60. The cam slot has a setting point 61 engaging the extension 58. The engaging surfaces 58a are slightly inclined to a line from said surface to the axis of the pivot at 55 and this inclination is practically such as to place the engaging surfaces in a neutral relation so far as the critical frictional engagement of these parts is concerned, so that the pressure on the parts 61 and 58 is practically nil, the cam slot being provided with a surface 61a to hold the parts in set position providing the inclination creates a stable condition, and the point 61 holds the parts in set position providing the inclination gives an unstable condition.

When a release is required the slide 60 is forced inwardly, handles 63 being provided for this purpose. With the initial movement, if the inclined surfaces provide an unstable condition the extension passes up along a cam surface along the upper edge of the slot 59 and the release is accomplished after starting through the pressure of the main spring. If the inclination 58a gives a stable condition the cam slot has an under surface 64 which engages the extension 58 and this positively rocks the latch 54 swinging the engaging surfaces 58 to an unstable position and the pressure of spring 10 completes the release so that in one modification there is a neutral engagement of the release parts or approximately so and the setting means is positively locked in position so that there is no danger of an accidental release. On the other hand, the release is accomplished practically without frictional resistance and is positively effected in a case of the parts assuming a stable condition.

What I claim as new is:

1. In a wringer having a frame; rolls mounted in the frame; and pressure means exerting pressure on the rolls; the combination with said pressure means of a safety release device comprising pressure-retaining means having a relation of parts approximately neutral in set position between stable and unstable relations, a lock locking said parts in pressure-retaining relation, and manually actuated release means unlocking the lock and comprising a trip means manually energized initially on release actuation and constructed and arranged to force a release action of the pressure-retaining means in a release direction during the release movement of the trip means.

2. In a wringer having a frame; rolls in the frame; pressure means exerting pressure on the rolls; and a detachable top receiving the pressure from the pressure means; the combination with top and pressure means of a safety release device releasing the means through the release of the top comprising retaining means having a relation of parts approximately neutral in set position between stable and unstable relations, a lock locking said parts in pressure-retaining relation, and manually actuated release means unlocking the lock and comprising a trip means manually energized initially on release actuation and constructed and arranged to force a release action of the pressure retaining means in a release direction during the release movement of the trip means.

3. In a wringer having a frame; rolls mounted in the frame; and pressure means exerting pressure on the rolls; the combination with the pressure means of a safety release device comprising pressure-retaining means having a relation of parts approximately neutral in set position between stable and unstable relations, a lock locking said parts in pressure-retaining relation, and manually actuated release means comprising a release bar responsive to releasing pressure throughout its length unlocking the lock and comprising a trip means manually energized initially on release actuation and constructed and arranged to force a release action of the pressure-retaining means in a release direction during the release movement of the trip means.

4. In a wringer having a frame; rolls mounted in the frame; and pressure means exerting pressure on the rolls; the combination with the pressure means of release means comprising pressure-retaining means having toggle links approximately neutral in set position between stable and unstable relations through alinement of the pivots of the links, a lock locking the links in set position, and manually actuated release means unlocking the lock and comprising a trip means manually energized initially on release actuation and constructed and arranged to force a release action of the links in a release direction during the release movement of the trip means to effect a release.

5. In a wringer having a frame; rolls mounted in the frame; pressure means exerting pressure on the rolls; a top receiving the pressure from the pressure means, said top being separable; and a toggle mechanism having a link having a connection for the link to the top, a link connected to the frame, one of said links forming a re-setting lever acting through the top to re-set pressure on the pressure means; the combination with said top and toggle lever of a latch on the toggle locking it in set position, and a release mechanism operating the latch to release the toggle mechanism, said release mechanism being directly mounted on the top.

6. In a wringer having a frame; rolls mounted in the frame; pressure means exerting pressure on the rolls; and a top receiving the pressure from the pressure means, said top being separable; the combination with said pressure means and top of a toggle mechanism having a link connected to the top, a link connected to the frame, one of said links forming a re-setting lever acting through the top to re-set pressure on the pressure means, said linkage in set position having its pivots in approximate alinement, a latch on the toggle mechanism locking it in set position, and a manually actuated release mechanism operating the latch to release the lever and comprising a trip means manually energized initially on release actuation and constructed and arranged to force a release movement of the linkage in a release direction during the release movement of the trip means to effect a release action of the pressure toggle mechanism.

7. In a wringer having a frame; rolls mounted in the frame; and pressure means exerting pressure on the rolls; the combination with the pressure means of a safety release device releasing the means comprising a latch mechanism having engaging surfaces approximately neutral between stable and unstable relations, a lock locking the engaging surfaces in set position, and manually operated release actuating means unlocking the lock and including a member effecting the disengagement of the engaging surfaces.

8. In a wringer having a frame; rolls mounted in the frame; pressure means exerting pressure on the rolls; and a detachable top receiving the pressure of the pressure means; the combination with said pressure means and top of a safety release device acting through a release of the top for releasing the pressure means comprising a latch mechanism having engaging surfaces approximately neutral between stable and unstable relations, a lock locking the engaging surfaces in set position, and manually operated release actuating means unlocking the lock and including a member effecting the disengagement of the engaging surfaces.

9. In a wringer having a frame; rolls mounted in the frame; and pressure means exerting pressure on the rolls; the combination with the pressure means of a safety release device releasing the means comprising a latch mechanism having engaging surfaces, said surfaces being inclined in set position with relation to the direction of stress on said surfaces making the frictional force component along the inclination between the engaged surfaces approximately equal to the disengaging force component along the inclination, a lock locking the engaging surfaces in set position, and manually operated release actuating means unlocking the lock and including a member effecting the disengagement of the engaging surfaces.

10. In a wringer having a frame; rolls mounted in the frame; and pressure means exerting pressure on the rolls; the combination with the pressure means of a safety release device releasing the means comprising latch members having engaging surfaces, one of the members being pivotally mounted and the engaging surface of one of the members being inclined with relation to a line from the point of engagement to the pivot of the pivoted latch member, the inclination having relation to the frictional engagement of the engaged surfaces to make the frictional force component along the inclination approximately equal to the camming action of the inclination of the surfaces, a lock locking the engaging surfaces in set position, and manually operated release actuating means unlocking the lock and including a member effecting the disengagement of the engaging surfaces.

11. In a wringer having a frame; rolls mounted in the frame; pressure means exerting pressure on the rolls; and a detachable top receiving the pressure of the pressure means; the combination with said pressure means and detachable top of a safety release device acting between the top and frame as members, comprising latch elements having engaging surfaces, one of the latch elements being pivoted, and one of the surfaces being carried on one of the members and the other surface being carried by the pivoted latch element, the latter being mounted on the other member, one of the engaging surfaces being inclined to a line extending from the point of engagement to the pivot of the pivoted latch element, the inclination having relation to the frictional engagement of the engaged surfaces to make the frictional force component along the inclination approximately equal to the camming action of the inclination of the stationary engaging surface, a lock locking the pivotal latch element in set position, and a manually operated release actuating means unlocking the lock and including a member effecting the disengagement of the engaging surfaces.

12. In a wringer having a frame; rolls mounted in the frame; pressure means exerting pressure on the rolls; and a detachable top receiving the pressure of the pressure means; the combination with the pressure means and detachable top of a safety release device acting between the top and frame as members, comprising latch elements having engaging surfaces, one of the latch elements being pivoted, and one of said surfaces being carried on the top member and the other surface being carried by the pivoted latch element directly mounted on the frame member, said surfaces being inclined in set position with relation to the direction of stress on said surfaces making the frictional force component along the inclination between the engaged surfaces approximately equal to the disengaging force component along the inclination, a lock locking the engaging surfaces in set position, and a manually operated release actuating means unlocking the lock and including a member effecting the disengagement of the engaging surfaces.

13. In a wringer having a frame; rolls mounted in the frame; pressure means exerting pressure on the rolls; and a detachable top receiving the pressure of the pressure means; the combination with said top and pressure means of a safety release device acting between the top and frame as members, comprising latch elements having engaging surfaces, one of the latch elements being pivoted on the top and the other latch element being carried by the frame, said surfaces being inclined in set position with relation to the direction of stress on said surfaces making the frictional force component along the inclination between the engaged surfaces approximately equal to the disengaging force component along the inclination, a lock locking the engaging surfaces in set position, and manually operated release actuating means unlocking the lock and including a member effecting the disengagement of the engaging surfaces.

14. In a wringer having a frame; rolls mounted in the frame; pressure means exerting pressure on the rolls; and a detachable top receiving the pressure of the pressure means; the combination with said pressure means and top of a safety release device acting between the top and frame as members, comprising latch elements having engaging surfaces, one of the latch elements being pivoted on the top and the other latch element being carried by the frame, said surfaces being inclined in set position with relation to the direction of strain on said surfaces making the frictional force component along the inclination between the engaged surfaces approximately equal to the disengaging force component along the inclination, a lock locking the engaging surfaces in set position, and manually operated release actuating means unlocking the lock and including a member effecting the disengagement of the engaging surfaces, said release actuating means being mounted on the top.

15. In a wringer having a frame; rolls mounted in the frame; pressure means exerting pressure on the rolls; and a detachable top receiving the pressure of the pressure means; the combination with the pressure means and detachable top of a safety release device acting between the top and frame as members, comprising latch elements having engaging surfaces, one of the latch elements being pivoted on the top and the other latch element being carried by the frame, said surfaces being inclined in set position with relation to the direction of stress on said surfaces making the frictional force component along the inclination between the engaged surfaces approximately equal to the disengaging force component along the inclination, a lock locking the engaging surfaces in set position, and manually operated release actuating means unlocking the lock and including a member effecting the disengagement of the engaging surfaces, said release actuating means being slidingly mounted on the top.

16. In a wringer having a frame; rolls mounted in the frame; pressure means exerting pressure on the rolls; and a detachable top receiving the pressure of the pressure means; the combination with the pressure means and detachable top of a safety release device acting between the top and frame as members, comprising latch elements having engaging surfaces, one of the latch elements being pivoted on the top and the other latch element being carried by the frame, said surfaces being inclined in set position with relation to the direction of stress on said surfaces making the frictional force component along the inclination between the engaged surfaces approximately equal to the disengaging force component along the inclination, a lock locking the engaging surfaces in set position, and manually operated release actuating means unlocking the lock and including a member effecting the disengagement of the engaging surfaces, said release actuating means being slidingly mounted on the top and comprising cams operating on the latch element.

17. In a wringer having a frame; rolls mounted in the frame; and pressure means exerting pressure on the rolls; the combination with said pressure means of a safety release device comprising pressure-retaining means, a lock locking said parts in pressure-retaining relation, and manually actuated release means unlocking the lock and comprising a trip means manually energized initially on release actuation and constructed and arranged to force a release action of the pressure-retaining means in a release direction during the release movement of the trip means.

18. In a wringer having a frame; rolls in the frame; pressure means exerting pressure on the rolls; and a detachable top receiving the pressure from the pressure means; the combination with the top and pressure means of a safety release device releasing the means through the release of the top comprising retaining means, a lock locking said parts in pressure-retaining relation, and manually actuated release means unlocking the lock and comprising a trip means manually energized initially on release actuation and constructed and arranged to force a release action of the pressure-retaining means in a release direction during the release movement of the trip means.

19. In a wringer having a frame; rolls mounted in the frame; and pressure means exerting pressure on the rolls; the combination with the pressure means of release means comprising pressure-retaining means having toggle links having its links approximately in alinement in set position, a lock locking the links in set position, and manually actuated release means unlocking the lock and comprising a trip means manually energized initially on release actuation and constructed and arranged to force a release action of the links in a release direction during the release movement of the trip means to effect a release of the pressure retaining means.

20. In a wringer having a frame; rolls mounted in the frame; pressure means exerting pressure on the rolls; and a top receiving the pressure from the pressure means, said top being separable; the combination with said pressure means and top of a toggle mechanism having a link connected to the top, a link connected to the frame, one of said links forming a re-setting lever acting through the top to re-set pressure on the pressure means, a latch on the lever locking it in set position, and a manually actuated release mechanism operating the latch to release the lever and comprising a trip means manually energized initially on release actuation and constructed and arranged to force a release movement of the linkage in a release direction during the release movement of the trip means to effect a release of the pressure retaining means.

WALTER L. KAUFFMAN, II.